(12) United States Patent
Kuusinen et al.

(10) Patent No.: US 7,872,980 B2
(45) Date of Patent: Jan. 18, 2011

(54) DETERMINATION OF A BIT RATE

(75) Inventors: Jarmo Kuusinen, Jyvaskyla (FI); Matti Turunen, Tampere (FI); Markku Ojala, Tampere (FI)

(73) Assignee: Nokia Corporation, Espoo (FI)

( * ) Notice: Subject to any disclaimer, the term of this patent is extended or adjusted under 35 U.S.C. 154(b) by 802 days.

(21) Appl. No.: 10/036,215

(22) Filed: Dec. 28, 2001

(65) Prior Publication Data
US 2002/0114306 A1 Aug. 22, 2002

(30) Foreign Application Priority Data
Dec. 29, 2000 (FI) ................................. 20002903

(51) Int. Cl.
*H04L 12/26* (2006.01)
*H04B 7/216* (2006.01)

(52) U.S. Cl. .................. 370/252; 370/342; 370/469

(58) Field of Classification Search ............... None
See application file for complete search history.

(56) References Cited

U.S. PATENT DOCUMENTS

| | | | |
|---|---|---|---|
| 5,774,496 A * | 6/1998 | Butler et al. ............ 375/225 |
| 6,098,039 A | 8/2000 | Nishida ................. 704/229 |
| 6,314,105 B1 * | 11/2001 | Luong ................. 370/395.2 |
| 6,473,399 B1 * | 10/2002 | Johansson et al. ......... 370/329 |
| 6,490,271 B1 * | 12/2002 | Erjanne ................. 370/347 |
| 6,850,540 B1 * | 2/2005 | Peisa et al. ............. 370/468 |
| 2005/0123427 A1 * | 6/2005 | Kim et al. ............... 417/572 |

FOREIGN PATENT DOCUMENTS

| | | |
|---|---|---|
| WO | WO 00/25483 | 5/2000 |
| WO | WO 00/33592 | 6/2000 |
| WO | WO 01/63855 A1 | 8/2001 |

* cited by examiner

*Primary Examiner*—Steven H. D Nguyen
(74) *Attorney, Agent, or Firm*—Perman & Green LLP (57) ABSTRACT

The aspects of invention relates to determining a bit rate in a communication device, the communication device including a protocol stack for transferring information to a second communication device, the protocol stack including a protocol layer, the protocol layer providing a logical channel for transferring first information through the protocol layer. According to the method, the first information is transferred through the protocol layer via the logical channel and the bit rate in the logical channel is determined on the basis of second information obtainable from the protocol layer. The invention also relates to a method of determining a bit rate when the communication device is receiving information as well as corresponding transmitting and receiving communication devices.

74 Claims, 6 Drawing Sheets

| LOGICAL CHANNEL ID | UL/DL (UL=1,DL=0) | NSAPI | RAB_ID | BIT RATE |
|---|---|---|---|---|
| 1 | 1 | 1 | 1 | VALUE 1 |
| 2 | 1 | 1 | 1 | VALUE 2 |
| 3 | 1 | 2 | 2 | VALUE 3 |
| 4 | 1 | - | 3 | VALUE 4 |

DETERMINATION OF A BIT RATE

BACKGROUND OF THE INVENTION

The present invention relates to the determination of a bit rate in a communication device. Especially, but not necessarily, the invention relates to the determination of a bit rate in a communication device intended for a third-generation mobile network.

Commercial communication networks, and cellular radio networks in particular, have grown strongly in popularity during recent years. This growth is at least partly due to the increase in the number of services provided and the improvement in the quality of the communication networks. At first, cellular radio networks were designed primarily to support speech transmission. However they already provide, or will provide in the near future, many other services, such as short messaging, image messaging and multimedia services, as well as services which provide access to the Internet. Some of these new services place more stringent requirements than usual on the network, for example, with regard to the data transmission rate of the network.

International Patent Application WO 00/33592 describes a system that provides the user of a mobile station in cellular radio network with a forecast of the bit rate the network would probably be able to provide for a connection if the user established the connection from his/her current location. The expected bit rate is determined on the basis of the quality of the signal received by the mobile station and the data transmission properties of the mobile station and base station.

The method described in International Patent Application WO 00/33592 provides only an expected bit rate. It does not provide real-time or up-to-date information about the actual bit rate achieved in an already existing connection between the communication device and the network.

SUMMARY OF THE INVENTION

Now a new solution has been invented with the objective of determining an up-to-date bit rate, or at least an almost up-to-date bit rate. One of the objectives of the invention is to calculate a more accurate bit rate estimate than that provided by the state of the art, based on the actual information flow between a first and a second communication device. The invention can be used to optimize an active connection in a communication device. An active TCP/IP connection in a third-generation communication device is an example of a connection which can be optimized.

According to a first aspect of the invention, there is provided a method of determining a bit rate in a first communication device, the first communication device comprising a protocol stack for transferring information to a second communication device, the protocol stack comprising a protocol layer, the protocol layer providing a logical channel for transferring first information through said protocol layer, in which method:

the first information is transferred through the protocol layer via said logical channel.

The method is characterized in that the bit rate in said logical channel is determined on the basis of second information obtainable from said protocol layer.

According to a second aspect of the invention, there is provided a method of determining a bit rate in a first communication device, the first communication device comprising a protocol stack for receiving information from a second communication device, the protocol stack comprising a protocol layer, the protocol layer providing a logical channel for transferring first information through said protocol layer, in which method:

the first information is transferred through the protocol layer via said logical channel.

The method is characterized in that the bit rate in said logical channel is determined on the basis of second information obtainable from said protocol layer.

According to a third aspect of the invention, there is provided a first communication device comprising a protocol stack for transferring information to a second communication device, the protocol stack comprising a protocol layer, the protocol layer being arranged to provide a logical channel for transferring first information through said protocol layer, the first communication device comprising:

a processing element for transferring the first information through the protocol layer via said logical channel.

The first communication device is characterized in that it further comprises:

a processing element for determining the bit rate in the logical channel on the basis of second information obtainable from said protocol layer.

According to a fourth aspect of the invention, there is provided a first communication device comprising a protocol stack for receiving information from a second communication device, the protocol stack comprising a protocol layer, the protocol layer being arranged to provide a logical channel for transferring first information through said protocol layer, the first communication device comprising: a processing element for transferring the first information through the protocol layer via said logical channel.

The first communication device is characterized in that it further comprises:

a processing element for determining the bit rate in the logical channel on the basis of second information obtainable from said protocol layer.

Said first information is preferably the actual information to be transferred from the first communication device to the second communication device, i.e. data, speech, video images or multimedia data. Said second information is preferably control information available in the communication device.

Said first communication device is preferably a terminal of a cellular communication network and said second communication device is preferably a network element of a cellular communication network. Alternatively, said first communication device is a network element of a cellular communication network and said second communication device is a terminal of a cellular communication network. Preferably, the cellular network is a third-generation mobile network. Preferably, the first communication device is a device that communicates using a WCDMA (Wideband Code Division Multiple Access) protocol stack. In an embodiment of the invention, the first communication device is a radio card that provides cellular network communication functions and can be coupled to a PC (Personal Computer). In this embodiment, a bit rate value/bit rate values can be transferred from the radio card to an application/applications in the PC. Alternatively, said second information, which is used for bit rate determination, can be transferred from the radio card to the PC. Thus, the bit rate determination can be performed in the PC.

Preferably, said protocol layer through which information is transferred in a logical channel is the MAC (Medium Access Control) Layer of the WCDMA protocol stack.

Preferably, the bit rate is determined on the basis of control information which controls the flow of information in the logical channel. In a preferred embodiment of the invention, said control information is a transport format used to control the information flowing in the logical channel. Said control information, on the basis of which the bit rate is determined, is preferably separate from the actual information to be transferred.

Preferably, the control information is obtained from a protocol layer of the WCDMA protocol stack.

Preferably, the control information obtained from the protocol layer in order to determine the bit rate comprises the values of the parameters TBS (Transmission Block Size) and TTI (Transmission Time Interval) in a given logical channel, where parameter TBS specifies the amount of data that can be transferred in a time interval specified by parameter TTI. Preferably, it also comprises a logical channel identifier for identifying the logical channel.

Preferably, when the first communication device is transmitting information, the values of parameters TBS and TTI are taken from the MAC Layer of the WCDMA protocol stack when a data block coming from the RLC Layer of the WCDMA protocol stack is transferred from a logical channel of the MAC Layer to a transport channel of the Physical Layer of the WCDMA protocol stack. When the first communication device is receiving information, the values of parameters TBS and TTI are preferably taken from the MAC Layer when a data block coming from a transport channel of the Physical Layer of the WCDMA protocol stack is transferred from a logical channel of the MAC Layer to the RLC Layer of the WCDMA protocol stack.

Preferably, the bit rate in a logical channel identified by a particular logical channel ID during a first period of time is determined on the basis of parameters TBS and TTI, where the value of parameter TBS indicates how much data can be transmitted during the period of time indicated by parameter TTI. Preferably, the values of parameters TBS and TTI are taken from the MAC Layer for use in bit rate determination only once during the period of time defined by TTI. Alternatively, parameters TBS and TTI are only taken from the MAC layer when a change in the value of the respective parameter occurs.

Preferably, the bit rate in said logical channel is determined by means of a mathematical calculation, in which the value of parameter TBS is divided by the value of parameter TTI.

Preferably, the bit rate value and/or an average thus determined is maintained and updated in a memory available for use by the first communication device. In a preferred embodiment of the invention, this takes place in a database. The memory can be located either within the first communication device or external to the first communication device. For instance, if the first communication device is a radio card with cellular network communication functions coupled to a PC, the memory available for use by the first communication device can be located in the PC. The average can be calculated as a running average.

Preferably, the bit rate value and/or average thus determined is/are provided for use by the other applications and protocol layers in the first communication device. In a preferred embodiment of the invention, the applications and other protocol layers in the first communication device can inquire about the bit rate value from the database. The applications and other protocol layers can use the bit rate value obtained in response to the inquiry for optimizing their transmitted information flow. If the first communication device is a radio card with cellular network communication functions coupled to a PC, the bit rate value and/or average bit rate value can be provided to applications within the PC to which the radio card is coupled.

In an embodiment of the invention, the bit rate in a given packet switched connection (PDP context) which uses more than one logical channel in the uplink and/or downlink direction is determined. In order to determine a total bit rate in a given direction, the bit rate values for the logical channels in that direction in use by the PDP context are added together.

BRIEF DESCRIPTION OF THE DRAWINGS

In the following the invention will be described in detail with reference to the accompanying drawings wherein.

DETAILED DESCRIPTION OF THE INVENTION

Figure 1:
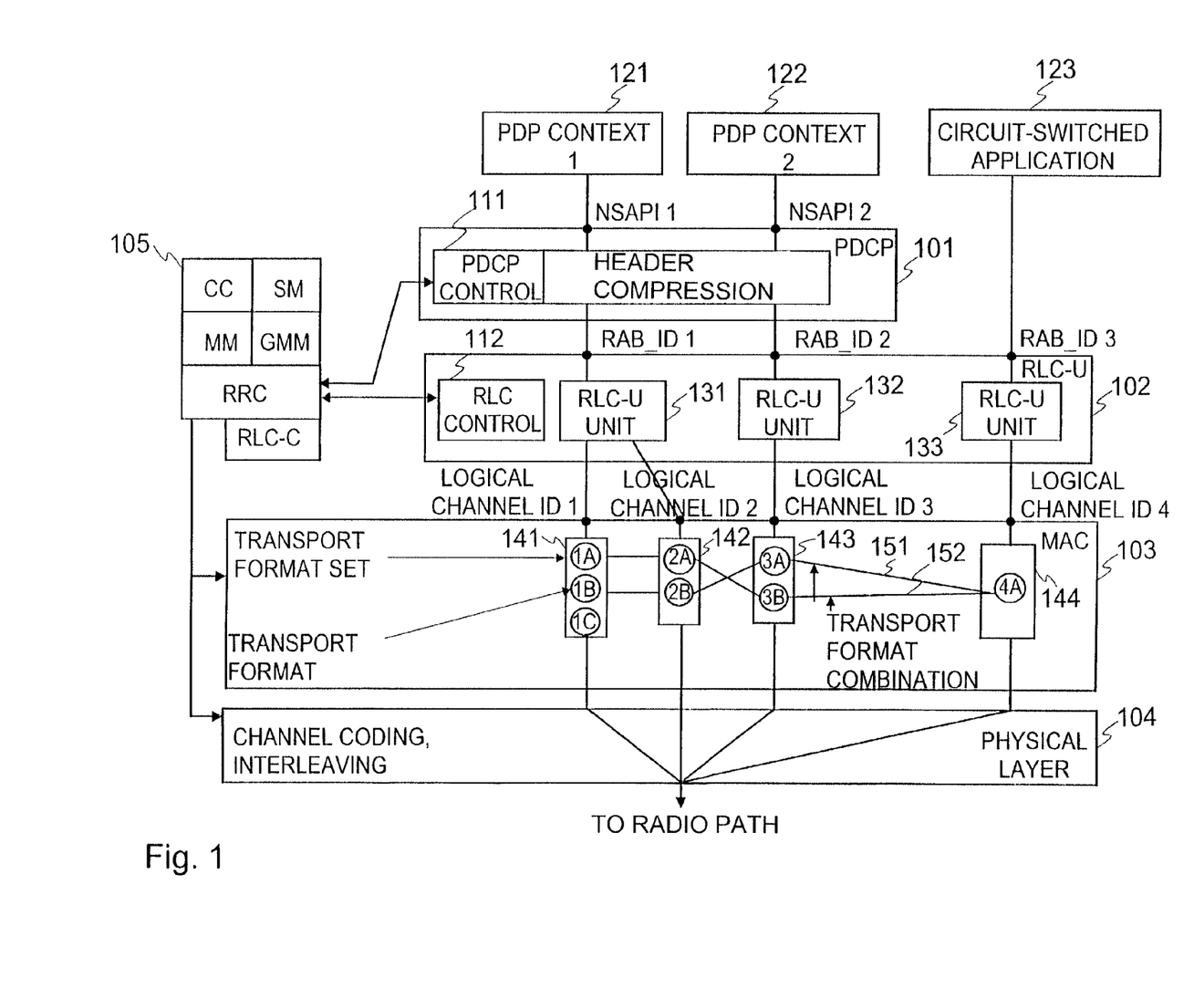
FIG. 1 shows part of the architecture of the protocol levels of a third-generation communication device.

FIG. 1 shows part of the architecture of the protocol levels in a terminal of a third-generation mobile communication network UMTS (Universal Mobile Telecommunications System). The terminal shown in FIG. 1 uses WDCMA technology. The terminal supports both packet switched and circuit switched data transmission and reception.

FIG. 1 shows the WCDMA protocol layers of the terminal: PDCP (Packet Data Convergence Protocol) 101, RLC-U (Radio Link Control-User Plane) 102, MAC (Medium Access Control) 103 and Physical Layer 104.

In uplink operation (transmission of data from the terminal to a base station), the PDCP Layer compresses the headers of the packets to be sent. Compression is required in order to make better use of the limited radio resources available for the system.

In downlink operation (reception of data sent from a base station to the terminal), the PDCP Layer de-compresses the headers of the packets received. Packet header compression and de-compression can be performed at least for TCP/IP packets or UDP/IP packets (User Datagram Protocol/Internet Protocol). PDCP Control Block 111 controls the operation of the PDCP Layer.

In the UMTS system, applications and services of different types are divided into different classes requiring different qualities of service, QoS. For example, the world wide web browser application and streaming applications (such as a packet-based video streaming application) of the terminal impose different requirements on the different parameters of the connection, such as the bit rate and residual bit error ratio. Applications can also impose requirements on the use of re-transmissions, for example. A PDP context (Packet Data Protocol) 121, 122 provides the PDCP Layer with information relating to the quality of service QoS. The same terminal can have one or more simultaneous PDP contexts with the network. An NSAPI (Network Layer Service Access Point Identifier) is an identifier identifying a PDP context at the PDCP Layer level. PDP contexts are used in packet switched data transmission, while circuit switched applications 123, which provide circuit switched services (such as a speech call or a circuit switched data call (for example a video call)), do not use the PDCP Layer at all but operate over the RLC-U Layer without the PDCP Layer.

In uplink operation, packets to be transmitted pass from the PDCP Layer to the RLC-U Units 131-132 of the RLC-U Layer. The RLC-U Units are identified by means of a RAB_ID identifier (Radio Access Bearer Identifier), in such a way that there is one RAB_ID corresponding to each NSAPI. The RLC Control Block controls the operation of the RLC-U Layer.

The RLC-U Unit maps the packets transferred to it by the PDCP Layer to one or more logical channel and transfers the data packets to the MAC Layer 103. Ultimately, one PDP context can use one or more logical channels.

In connection with circuit switched applications, the RLC-U Unit 133 gets the information flow to be transmitted directly from a circuit switched application 123. The information flow can contain only speech information (speech call) or data (data call) or both (multimedia call, for example). The RLC-U Unit transfers the information flow to a logical channel of the MAC Layer.

In downlink operation, received data packets pass through the RLC-U Units in the opposite direction to the packets to be transmitted in uplink operation. Their route goes from the logical channels of the MAC Layer through the RLC-U Units to the PDCP Layer.

In the MAC Layer, the data packets flow in the logical channels of the MAC Layer. In uplink operation, the MAC Layer maps the data packets flowing in the logical channels and the circuit switched information flow to the transport channels of the Physical Layer for transmission over the radio link. The MAC Layer assigns the available radio resources between the different logical channels in such a way that the available radio resources are not exceeded. Ideally this is done in such a way as to use the available radio resources as efficiently as possible.

In downlink operation, the MAC Layer receives data packets and the information flow associated with circuit switched services from the Physical Layer to its logical channels and transfers the packets and circuit switched information flow to the RLC-U Units. The logical channels of the MAC Layer are identified by a logical channel identifier (ID). The logical channels are simplex (unidirectional) channels.

In uplink operation, the Physical Layer 104 performs channel coding and interleaves the packet switched data and the flow of information associated with circuit switched services and is responsible for sending it to the base station. In downlink operation, the Physical Layer receives, de-interleaves and channel de-codes the packet switched data and the information flow associated with circuit switched services sent from the base station.

The left-hand-side of FIG. 1 shows control function blocks 105 coupled to the previously described protocol layers. The Call Control block CC performs operations related to the control of circuit switched services. Among other things, it accepts and rejects requests for call establishment. In circuit switched connections the Mobility Management block MM performs operations related to roaming of the terminal.

Among other things, the Session Management block SM performs operations related to the activation, modification and de-activation of PDP-contexts. In packet switched operation, it controls the configuration of the protocol stack together with the RRC Layer. The GMM block (GPRS, General Packet Radio System, Mobility Management) is responsible for mobility management (for example handovers) in packet switched operation.

The RRC Layer is a protocol layer responsible for the signaling of many kinds of control information between the terminal and the network. The RRC Layer sets the control parameters of the lower protocol layers (the MAC Layer and the Physical Layer) and is largely responsible for the establishment of connections between the terminal and the network.

The RLC-C Layer (Radio Link Control-Control Plane) performs specific operations related to the transmission of signaling messages between the terminal and the network. The RLC-C Layer, which participates in the transfer of signaling messages, and the RLC-U Layer (the RLC-U Units), which participates in the transfer of the actual user data (the actual information to be sent), together form the RLC Layer as a whole.

The control function blocks 105 are aware of the NSAPI and the RAB_ID Identifier of a given connection as well as the identifiers (IDs) of the logical channels used by the connection. The control function blocks are also aware of the direction of the logical channel (uplink UL/downlink DL).

In a WCDMA system, the allocation of radio resources is performed as follows. When a connection is established between the terminal and the network, or when radio resources are re-allocated, the RRC Layer assigns a set of transport formats to each logical channel of the MAC Layer that is going to be used in the connection. A transport format set 141-144 comprises one or more transport formats 1A, 1B, 1C; 2A, 2B; 3A, 3B; 4A. A transport format is typically a data structure containing control information according to which the transmission and reception of information is controlled. Said control information comprises, among other things, parameters TBS (Transport Block Size) and TTI (Transmission Time Interval). Thus, the transport format specifies the size TBS (Transport Block Size) of the data block which can be transmitted via the logical channel during the period of time TTI. Typical TBS parameter values are 80, 160, 320, 640 or 1280 bits, for example. Parameter TTI is the same for all transport formats of a transport format set. It is a multiple of 10 ms, such as 30 ms.

During the transmission of data blocks, the MAC Layer can independently choose which transport format of the transport format set allocated to the logical channel it uses in the transmission of each data block. If there are several logical channels active at the same time, the MAC Layer chooses the transport formats to be used in the different logical channels in such a way that the available radio resources are not exceeded. On the other hand, the MAC Layer chooses the transport formats in such a way that the radio resources are used as efficiently as possible. The group of transport formats comprising the transport formats in use simultaneously in the different logical channels is called a transport format combination. Two different transport format combinations are shown in FIG. 1. In the first combination 151, logical channel 1 uses transport format 1B, logical channel 2 uses transport format 2B, logical channel 3 uses transport format 3A and logical channel 4 (a circuit switched service) uses a default transport format 4A. In the second combination 152, logical channel 1 uses transport format 1A, logical channel 2 uses transport format 2A, logical channel 3 uses transport format 3B and logical channel 4 uses default transport format 4A.

In downlink operation, the information flow (the flow of data blocks) in FIG. 1 proceeds from the bottom of the Figure to the top. To be able to read the data blocks received from the Physical Layer correctly, the MAC Layer has to know the transport format used at the transmitter. At the transmitter, a transport format indicator TFI (Transport Format Indicator), i.e. a given bit pattern, is associated with the data block to be sent. The TFI informs the MAC Layer at the receiving end (a terminal, for example) of the transport format used at the transmitter (in the network, for example).

Figure 2:
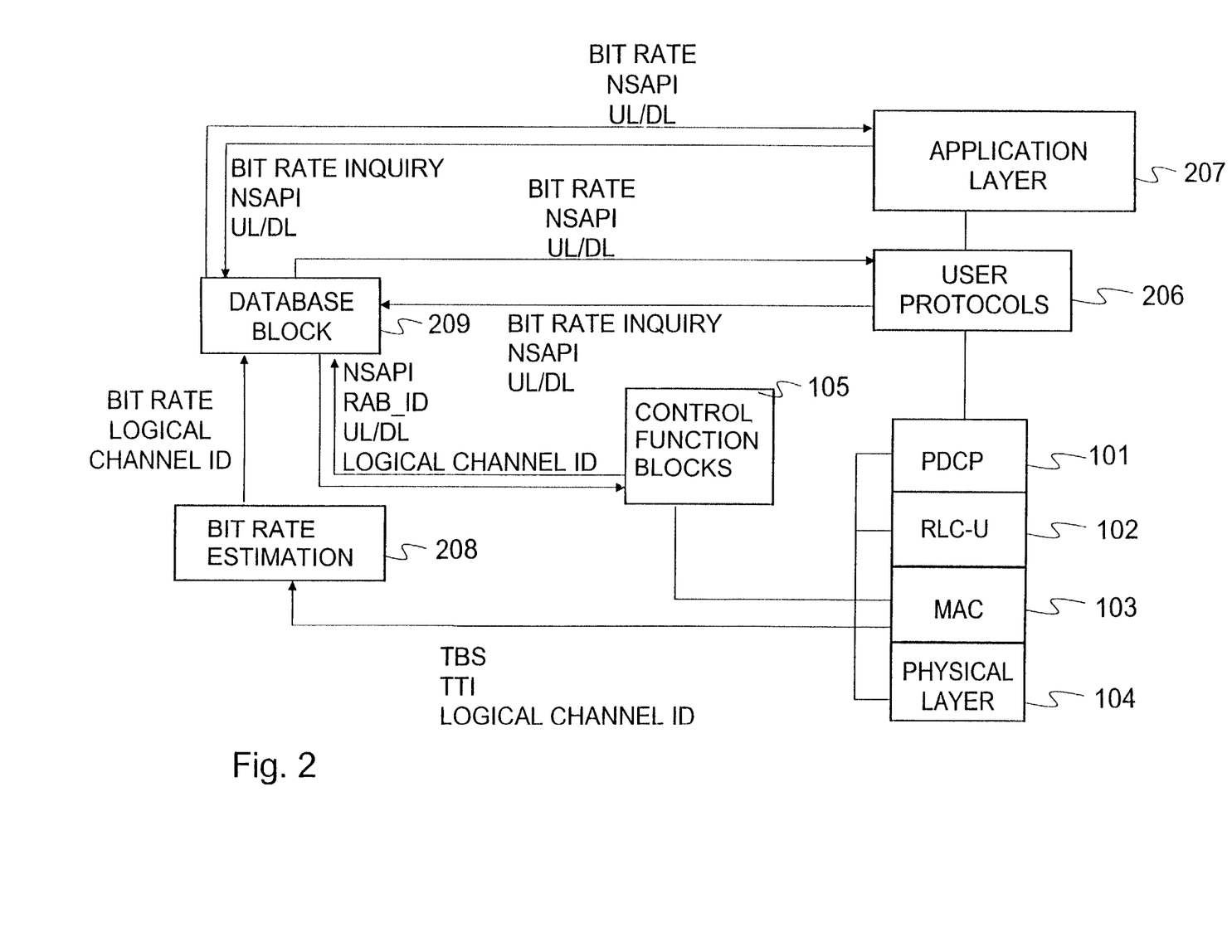
FIG. 2 shows an arrangement for bit rate determination according to an embodiment of the invention.

In the following, the invention will be described by means of an example with reference to FIG. 2 which illustrates a preferred embodiment of the invention implemented in a terminal of a third-generation mobile network. The protocol layers PDCP 101, RLC-U 102, MAC 103 and the WCDMA Physical Layer 104 known from FIG. 1 are shown at the right-hand-side of the Figure. The control function blocks 105 known from FIG. 1 are shown as a common block in the middle of the Figure. The control function blocks 105 are coupled to the protocol layers 101-104 and to a database block 209. The user protocols 206, which can be IP (Internet Protocol), TCP (Transmission Control Protocol), UDP (User Datagram Protocol), HTTP (HyperText Transfer Protocol) as well as WAP (Wireless Application Protocol) protocols, for example, are situated on top of the PDCP Layer in the protocol stack. The application layer 207 resides on top of the user protocols 206.

The MAC Layer is coupled to a bit rate estimation block 208 which, in turn, is coupled to the database block 209. The user protocols 206 and the application layer 207 can make bit rate inquiries to the database block 209.

According to a preferred embodiment of the invention, when the MAC Layer transfers a data block from a logical channel to a transport channel in the Physical Layer, the identifier (ID) of the logical channel, as well as the values of parameters TBS and TTI, are transferred from the MAC Layer to the bit rate estimation block 208. If there is only one logical channel, it is not always absolutely necessary to use a logical channel identifier (ID), and for this reason a logical channel identifier (ID) does not always have to be transferred from the MAC Layer to the bit rate estimation block.

The bit rate estimation block 208 calculates the bit rate in the logical channel using the parameters TBS and TTI. The details of the calculation process will explained in more detail in the description of FIG. 4.

The bit rate estimation block sends the bit rate it has calculated and the logical channel identifier (ID) to database block 209 which, according to the invention, maintains information about the connections in a database. The database block is coupled to the control function blocks 105, from which it obtains the NSAPI and the RAB_ID identifier values corresponding to the logical channel identifier (ID), as well as the direction (UL/DL) of the logical channel.

The user protocols 206 and the applications of the application layer 207 can make inquiries to the database block 209. They can ask the database block about the bit rate achieved in the uplink or downlink direction in a particular connection (PDP context) identified by a given NSAPI. In this situation, the NSAPI and information about the direction (UL/DL) is delivered to the database block. In response to the inquiry, the database block returns information about the bit rate to the originator of the inquiry. The details of inquiries made by the user protocols and the applications of the application layer will be discussed again later in this description. The database can be implemented in several alternative ways which will be considered again in the description of alternative embodiments of the invention.

Figure 3:
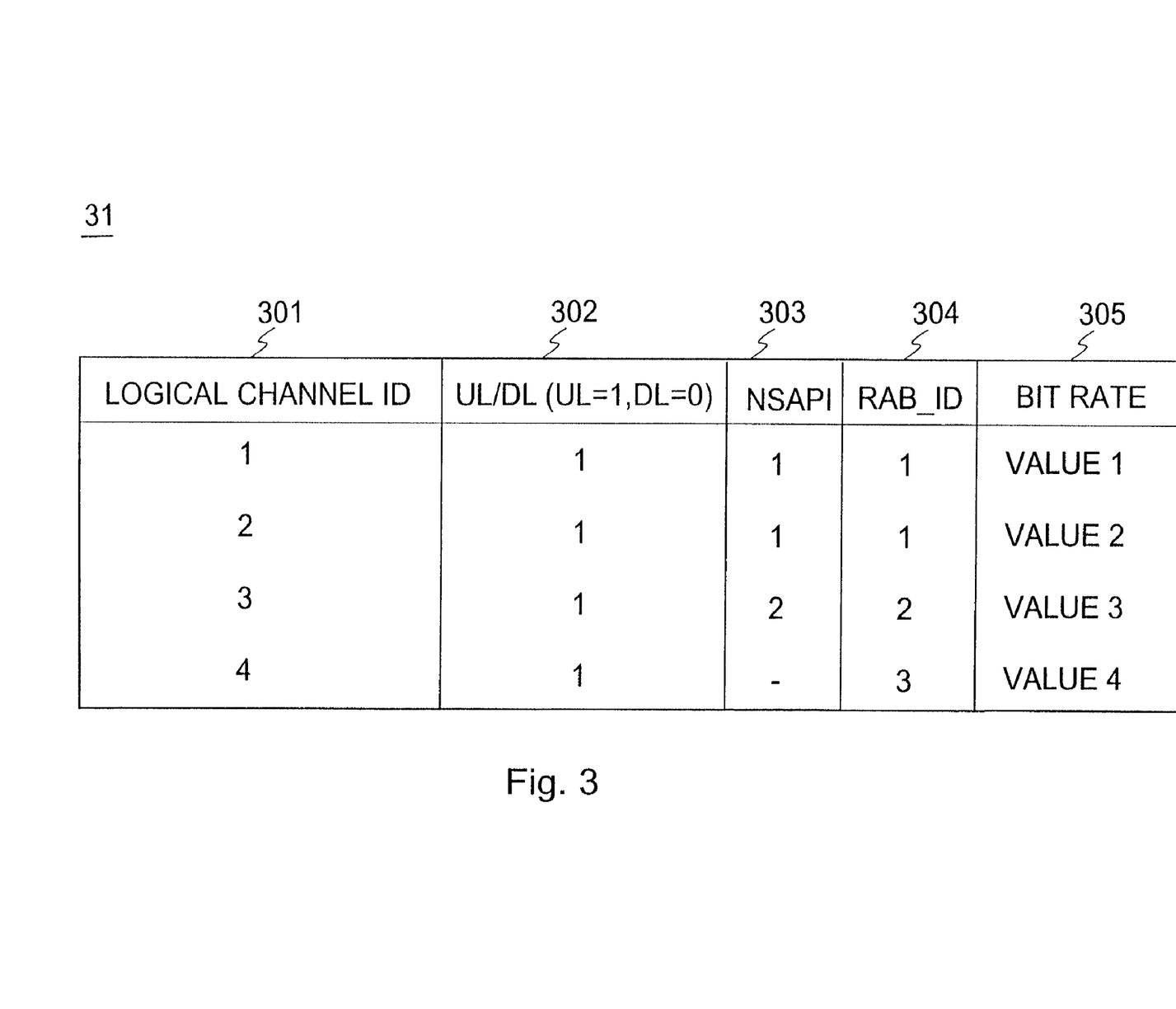
FIG. 3 shows the information content of a database according to a preferred embodiment of the invention.

FIG. 3 illustrates the data that the database maintained by the database block preferably comprises. In addition to the data presented here, the database 31 can comprise other data, as will be explained in the description of the alternative embodiments of the invention.

FIG. 3 also shows a possible structure for the database 31, but it will be understood by those skilled in the art that the database 31 can also be implemented in other ways without departing from the characteristics of the invention. For instance, instead of one centralized database, it is possible to form a separate database for each different logical channel.

In the example shown in FIG. 3 column 301 of the database 31 "Logical Channel ID" indicates the logical channel identifier (ID). Column 302, "UL/DL", indicates the direction of the logical channel, which is either downlink (from the cellular network base station to the terminal) or uplink (from the terminal to the base station). In this example, the uplink and downlink directions are denoted by numbers 1 and 0, respectively. Column 303, "NSAPI", shows the NSAPI identifier of the PDP context, corresponding to the logical channel identifier (ID). Column 304, "RAB_ID", indicates the RAB_ID identifier which corresponds to the logical channel identifier (ID). Preferably, all the identifiers mentioned above and the values representing the direction of the connection are integers. The database does not necessarily have to contain RAB_ID identifiers because the RAB_ID identifier corresponding to a particular NSAPI can be retrieved from the control function blocks if necessary. Typically, all the other identifiers can be retrieved from the control function blocks on the basis of the logical channel identifier (ID). However, the presence of the other identifiers in the database 31 simplifies the processing tasks when responding, for example, to a bit rate inquiry made by an application of the application layer since, in this case, the necessary identifiers can be found directly from the database 31 and they do not have to be requested separately from the control function blocks.

Column 305, "Bit Rate", maintains bit rate values for each logical channel (values 1 to 4) calculated and sent to the database block by the bit rate estimation block, each logical channel being identified by a logical channel identifier (ID). In its simplest form the database comprises only the logical channel identifiers (ID) and the bit rate values.

In FIG. 3, the columns of the database 31 contain values corresponding to the example shown in FIG. 1, in which the NSAPI assigned the value 1, is mapped to a RAB_ID whose value is 1. The RAB_ID, in turn, is mapped to two different logical channels of the MAC Layer, the identifiers of which are 1 and 2. The NSAPI assigned the value 2, is mapped to a RAB_ID having the value 2 which, in turn, is mapped to a single logical channel of the MAC Layer, the identifier of this channel being 3. The RAB_ID assigned the value 3, is mapped to one logical channel of the MAC Layer, the identifier of this channel being 4. The circuit switched application (whose RAB_ID in this case is 3) does not use the PDCP Layer at all and has therefore no NSAPI identifier. As FIG. 1 illustrates the transmission of information, all the logical channels 1 to 4 are uplink channels (UL/DL=1).

Figure 4:
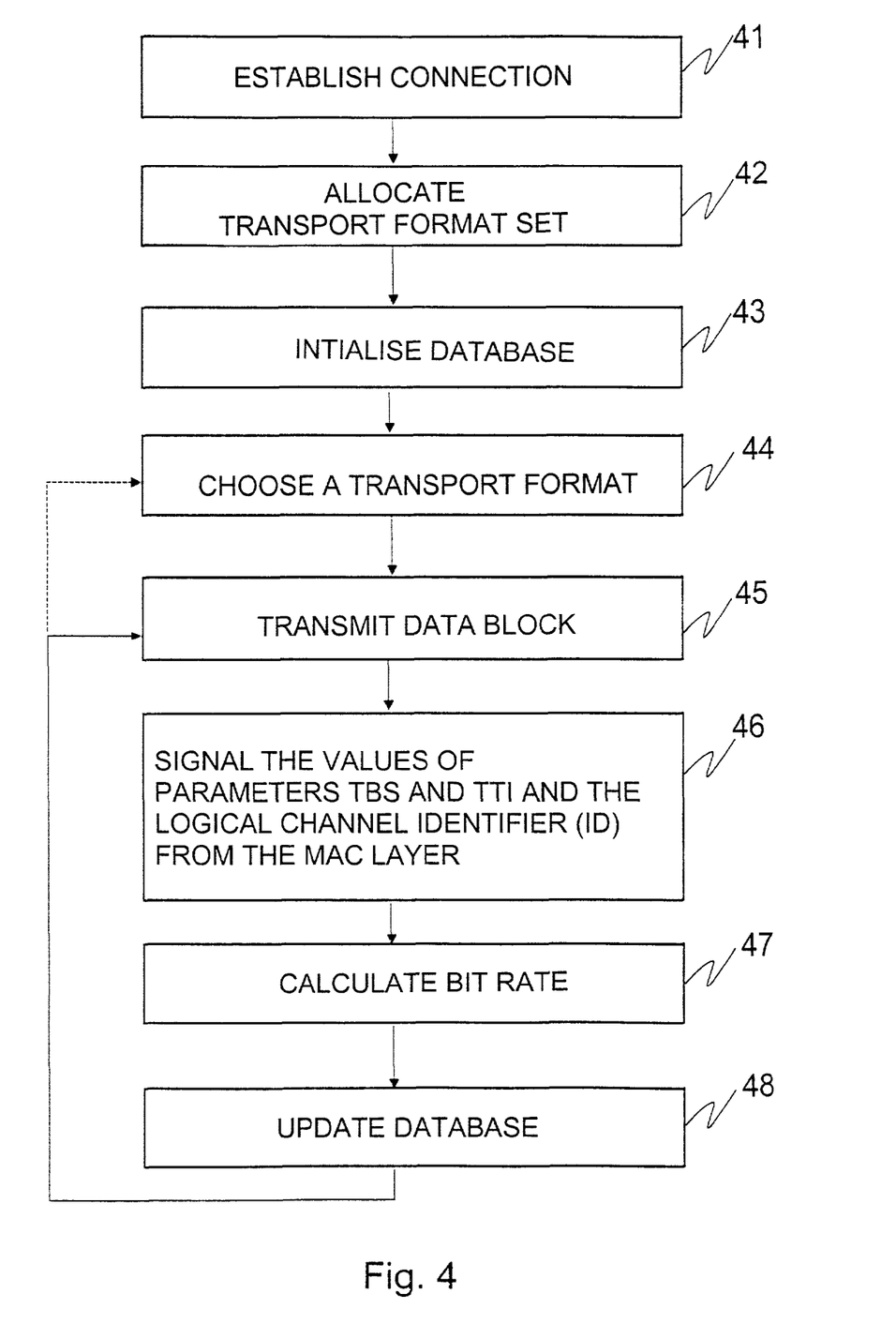
FIG. 4 is a flow chart illustrating the bit rate determination method according to the invention in a communication device in uplink operation.

The flow chart of FIG. 4 illustrates the bit rate determination method according to a preferred embodiment of the invention in the uplink direction in a mobile station of a cellular communication network. First, a connection between the terminal and the network is established (block 41). In the terminal the RRC block is mainly responsible for establishing the connection. Establishing a connection results in the creation of one or more data streams, so-called data pipes, for the transmission and reception of data blocks from the PDCP Layer. The data pipes pass through RLC-U Layer and the MAC Layer to the Physical Layer. A data pipe can divide into branches leading from the RLC-U Unit to more than one logical channel of the MAC Layer.

The RRC Block allocates a set of transport formats to each logical channel (block 42). The database of the database block is initialised in block 43. In the initialisation process, the database obtains the logical channel identifiers (IDs), as well as the NSAPI and the RAB_ID identifiers to be used in the connection from the control function blocks and writes them into the database.

When the actual data transmission starts, the MAC Layer receives data blocks to be transmitted from the RLC-U Block. In connection with transmission of a data block, the MAC Layer chooses the transport format to be used in each transmitting logical channel (block 44) from the transport format set previously specified by the RRC Block. The data block is then transmitted (block 45). When transmitting the data blocks, the MAC Layer maps the logical channels to the transport channels of the Physical Layer. As a result of the mapping, the data blocks are transferred to the Physical Layer, which is responsible for actual transmission of the data blocks over the radio link. It will be understood by those skilled in the art that the MAC Layer not only forwards the data blocks to the Physical Layer for transmission over the radio link but also performs other operations on them. The MAC Layer performs certain ciphering operations, for example.

When the MAC Layer transfers the data block from a logical channel to the Physical Layer for transmission, it provides the bit rate estimation block with the identifier (ID) of the logical channel in question as well as the values of parameters TBS and TTI (block 46).

As mentioned above, the transport format defines the size TBS of the data block transferred from the RLC-U Unit through the logical channel of the MAC Layer to the transport channel of the Physical Layer for transmission during the period of time TTI. Naturally, the transfer of a data block only takes place if the RLC-U Unit has data to be transmitted (a data block to be transmitted). On the other hand, if the RLC-U Unit has an amount of data to be transmitted which exceeds one TBS, the remaining data blocks are transmitted under control of the MAC Layer during the next transmission time interval or intervals TTI. A different amount of data can be transmitted in different transmission time intervals TTI, depending on the transport format in use during the time interval, i.e. the transport format defines the size of the data block to be transmitted during the time interval in question by means of the parameter TBS. As stated earlier, the transport formats for the different logical channels during different transmission time intervals TTI, that is, the transport format combination, is chosen by the MAC Layer independently, depending on the amount of data currently available.

As the values of parameters TBS and TTI are delivered from the MAC Layer to the bit rate estimation block when a data block is transferred from the MAC Layer to the Physical Layer, the bit rate estimation block can estimate the bit rate achieved during time period TTI in a logical channel identified by a particular logical channel identifier (ID). The bit rate is calculated (block 47) by dividing the size of the data block TBS by the transmission time interval TTI. If, for instance, TBS and TTI are 640 bits and 30 ms, respectively, the bit rate is 640/0.030 bits, that is approximately 21.3 kbit/s. This represents the bit rate in the logical channel during the 30 ms time interval in question. This bit rate will be called the instantaneous bit rate.

It is sufficient that the values of parameters TBS and TTI as well as the logical channel identifier (ID) are provided only once during a time interval TTI. If there are no data blocks flowing in the logical channel, the values of parameters TBS and TTI are not delivered to the bit rate estimation block.

Preferably, the bit rate estimation block thus concludes that the logical channel is in an IDLE state, i.e. no data is transmitted through it during transmission time interval TTI.

The bit rate estimation block transfers the calculated bit rate, together with the identifier (ID) of the logical channel in question to the database block. The database block updates the bit rate value for the logical channel in the database on the basis of the identifier (ID) of the logical channel in question (block 48). If the values of parameters TBS and TTI are not delivered to the bit rate estimation block during time period TTI, the MAC Layer has not transferred a data block to the Physical Layer for transmission during that particular TTI. Consequently, the bit rate value is not updated in the database and the earlier bit rate value remains valid. In this case, the bit rate value in the database represents the maximum available bit rate in the logical channel, assuming that the transport format of the logical channel has not been changed. The process returns from block 48 to block 45 for transmission of the next data block. The arrow from block 48 continues as a broken line to block 44 where a new transport format can be chosen for the logical channel for the transmission of the next data block.

Figure 5:
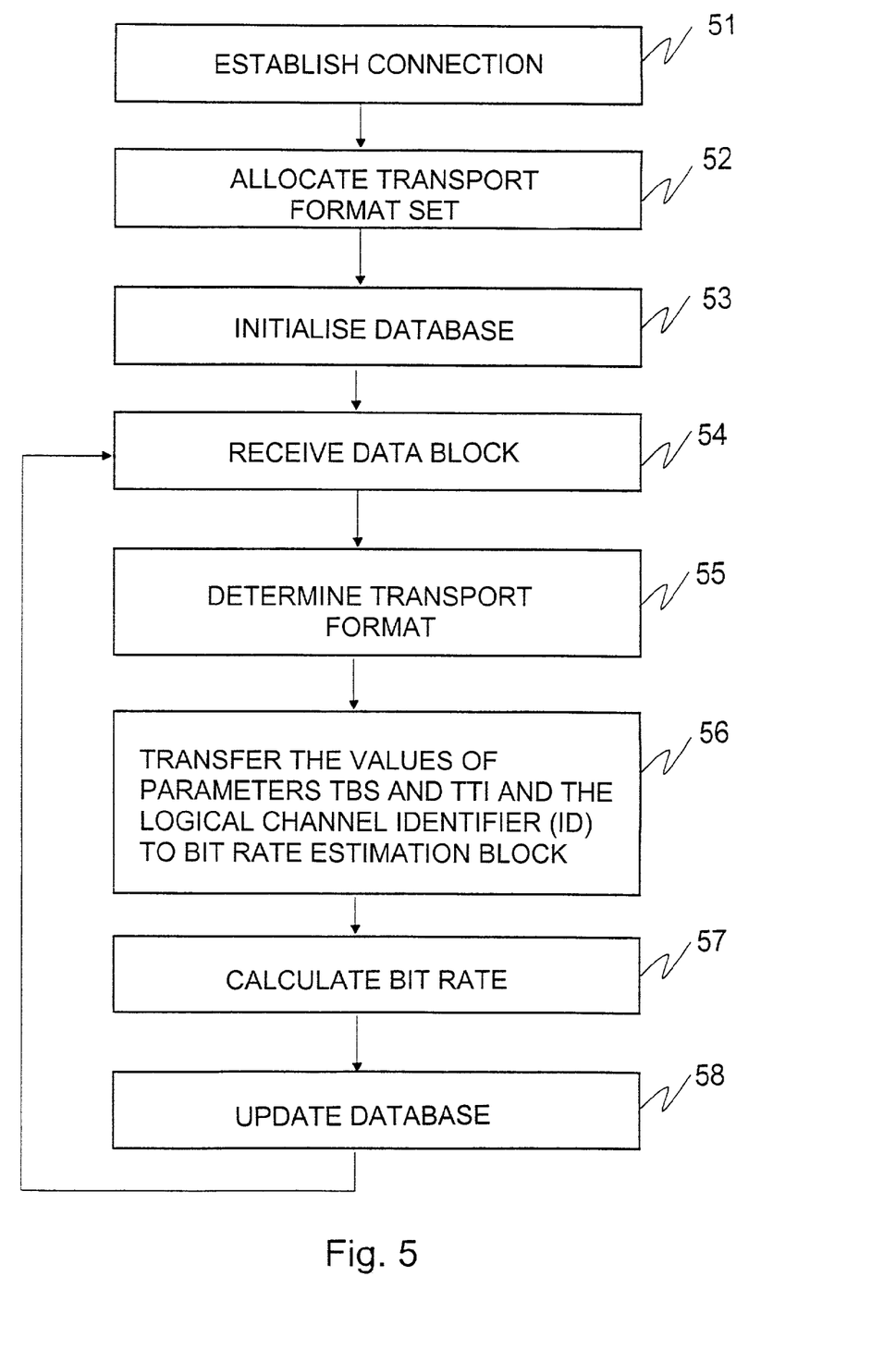
FIG. 5 is a flow chart illustrating the bit rate determination method according to the invention in a communication device in downlink operation.

The flow chart of FIG. 5, illustrates the bit rate determination method according to the invention in the downlink direction in a mobile station of a cellular communication network. A connection is established between the network and the terminal in the same way as explained in the description of FIG. 4 (block 51).

The RRC Block allocates a set of transport formats to each logical channel of the MAC Layer (block 52). The RRC Block agrees the transport format set to be used in the connection with the other peer, in this example the network, during the connection establishment phase. The database of the database block is initialised in block 53 in the same way as in Block b3. After this, reception of data blocks commences (block 54). So that it can read the data blocks received, the MAC Layer first determines the transport format in use in each receiving logical channel (block 55). As described above, the transmitter (the network) associates a transport format indicator (TFI) with each transmitted data block. The MAC Layer uses this information to determine the transport format.

When receiving data blocks, the MAC Layer transfers a data block arriving from the Physical Layer to an RLC-U Unit in the RLC-U Layer. When transferring the data block, the MAC Layer provides the identifier (ID) of the logical channel and the values of parameters TBS and TTI to the bit rate estimation block (block 56).

The bit rate estimation block calculates the bit rate achieved in the logical channel identified by the logical channel identifier (ID) during the TTI in question. The bit rate is estimated (block 57) by dividing the size TBS of the received data block by the transmission time interval TTI, in a manner corresponding to that described in connection with the transmission of data blocks. If the MAC Layer does not transfer data blocks, the values of parameters TBS and TTI are not delivered to the bit rate estimation block.

The bit rate estimation block transfers the calculated bit rate, as well as the identifier (ID) of the logical channel in question, to the database block. The database block updates the bit rate value for the logical channel in the database, on the basis of the identifier (ID) of the logical channel in question (block 58). If the values of parameters TBS and TTI are not delivered to the bit rate estimation block, no bit rate value is sent to the database block to update the database. The process returns from block 58 to block 54, for reception of the next data block.

In the following, several other preferred and alternative embodiments of the invention will be described. The transport format in use in a logical channel can be changed at the moment when a first transmission time interval ends and a second transmission time interval begins. Correspondingly, when the transport format changes, the bit rate can also change. The bit rate can vary greatly depending on which transport format of the transport format set is currently in use in the logical channel. It is therefore practical to maintain bit rate averages in the database, in addition to the real-time or current bit rate in the present transmission time interval TTI (or that just ended), in order to get an overall picture of the bit rate behaviour over a longer period of time.

In an alternative embodiment of the invention, a bit rate average for each logical channel is maintained in the database of the database block, in addition to the instantaneous bit rate for the current transmission time interval (or that just ended). Preferably, this is implemented in the form of a running average. The running average takes into account a given number (e.g. 10) of the latest bit rate values calculated by the bit rate estimation block for a given logical channel. When the database block receives a new bit rate value from the bit rate estimation block, the database updates the running average by adding the ten most recent instantaneous bit rate values together, dividing the sum by 10 and storing the result in the database. Thus, in this embodiment, at any given time the database comprises the ten most recent bit rate values and their average.

If the transmission time interval TTI changes during these ten periods of time, the average does not necessarily represent an exactly correct value for the actual average bit rate. The length of the transmission time interval TTI may change if the MAC Layer gets a new transport format set in the middle of an existing connection in which the value of parameter TTI is different from that in the earlier transport format set. In this case, a more accurate bit rate value is obtained from the sum $\Sigma[a_i(TBS/TTI)_i]$ where index i runs from 1 to 10, $(TBS/TTI)_i$ is the instantaneous bit rate in transmission time interval i and $a_i$ is a weighting coefficient for transmission time interval i. For each transmission time interval the weighting coefficient $a_i$ is calculated from the equation $a_i=TTI_i/(\Sigma TTI)$ where $TTI_i$ is the length of the transmission time interval and $\Sigma TTI$ is the sum of the lengths of all transmission time intervals (in this case the sum of the ten most recent transmission time intervals). In this alternative embodiment of the invention, the database block calculates the bit rate average on the basis of the instantaneous bit rates delivered to it by the bit rate estimation block using the equation mentioned above.

In another alternative embodiment of the invention, a fixed average is calculated instead of a running average. In this case an average is calculated using all bit rate values delivered to the database block by the bit rate estimation block after a given moment of time (e.g. after the moment of activation of the PDP context).

In another alternative embodiment of the invention, the database block maintains information on the total capacity of the MAC Layer. The database blocks scans and periodically (e.g. at 0.2-second intervals) adds together the bit rate values of all logical channels to obtain the total bit rate of the whole MAC Layer and writes the total bit rate value into the database. Here it should be appreciated that if there is no on-going transmission/reception, the bit rate value in the database does not necessarily represent the actual bit rate but rather the maximum available capacity in the logical channel. Hence, if a logical channel is in an IDLE state, i.e. it is not transmitting/ receiving data blocks, an "out-of-date" bit rate value may be recorded in the database for the channel in question since, in a preferred embodiment of the invention, the value is updated only when transmission/reception is taking place. The out-of-date bit rate value is ignored when determining the total bit rate. For instance, the database block can record the moments at which the last bit rate value update was made and conclude that the bit rate value is "out-of-date" if the last update was performed substantially more than one transmission time interval TTI prior to the present moment.

In connection with the previous description of a preferred embodiment of the invention (in both the data transmission and data reception examples), it was mentioned that the values of parameters TBS and TTI are not delivered to the bit rate estimation block if there are no data blocks flowing in the logical channel. Furthermore, it was stated that if the values of parameters TBS and TTI are not delivered to the bit rate estimation block during time period TTI the bit rate value is not updated in the database but the earlier bit rate value remains valid.

However, another alternative embodiment of the invention operates in a different manner. If data blocks are not flowing in a logical channel, the values of parameters TBS and TTI are still not delivered to the bit rate estimation block. The bit rate estimation block thus concludes that the logical channel is in an IDLE state, i.e. no data will pass through it during the transmission time interval TTI in question. Therefore, in this embodiment, the bit rate estimation block sends a bit rate value of 0 to the database block, together with the identifier (ID) of the logical channel. The database block updates the database entry for the logical channel specified by the identifier (ID) with a bit rate value of 0. In this way, the database can be kept up-to-date even when no data is being transmitted/ received.

As suggested above, the user protocols and the applications of the application layer can request instantaneous bit rate values and/or averages from the database. These inquiries take place according to a particular program process. Depending on the response obtained from the database, the protocols and applications can then adapt their own operation.

In an embodiment of the invention, a packet-based video application asks the database block about the bit rate achieved in the uplink direction in a particular connection (PDP context) identified by a NSAPI. Because a PDP context can use one or more individual logical channels (a PDP context can be mapped to one or more logical channel), the bit rate for a given PDP context can be obtained by adding together the bit rates in the logical channels used by the PDP context. The video application sends the NSAPI and direction (UL) to the database block according to a program process. On the basis of the NSAPI and direction (UL), the database block retrieves the bit rate values of those logical channels operating in the uplink direction in the PDP context identified by the NSAPI. The database block adds the bit rate values of the different logical channels together to obtain the total bit rate used in the connection identified by the NSAPI. Depending on the request, the database block can return either the total bit rate during the latest transmission time interval, the sum of the running averages of the bit rates in the different logical channels in use by the PDP context, or both these values to the video application. By default the database returns the sum of the bit rates in the different logical channels in use by the PDP context in question during the most recent transmission time interval TTI. This represents the total bit rate value for the PDP context in question at the MAC Layer level.

After receiving the response, the video application can adapt the data flow it transmits to the protocol layer on the basis of the available MAC Layer bit rate. For instance, the video application can reduce the amount of data to be transmitted in the video stream if the available bit rate is low. The amount of data in the video stream can be reduced, for example, by decreasing the resolution of the image to be transmitted or the frame repetition rate. Alternatively or additionally, the video application can either increase or decrease the compression of the video stream on the basis of the available bit rate. Here, the bit rate value obtained in response to the inquiry represents the available bit rate. In other words, the video application assumes that the bit rate value obtained in response to the inquiry represents the bit rate that can be achieved at that moment of time.

In another embodiment of the invention, the TCP/IP stack (which belongs to the user protocols, see FIG. 2) requests the bit rate from the database block in a similar way and, on the basis of the bit rate value supplied by the database block, makes a decision to start or stop end-to-end IP payload compression. Alternatively or in addition, the TCP/IP stack can adjust the "TCP Sliding Window" mechanism on the basis of the bit rate, for example in such a way that the size of the window is decreased if the available bit rate is low and the size of the window is increased if the available bit rate is high. In this way, the invention provides a means for optimizing a TCP/IP connection, for example.

In an alternative embodiment of the invention, instantaneous bit rate values and/or bit rate averages are transferred automatically from the database block to the user protocols and/or applications of the application layer. For instance, a program process under control of an application can be used to determine when the transfer of values will start and when it will stop.

Furthermore, in an embodiment of the invention, the total bit rate of two or more PDP contexts in a particular direction is determined by adding together the bit rates of the logical channels in use in the PDP contexts in the direction in question, or by adding together the bit rate values obtained for the different PDP contexts.

Furthermore, in an embodiment of the invention, an estimate of the actual bit rate is calculated at the level of a layer other than the MAC Layer. For example, an estimate of the throughput of the PDCP Layer can be calculated on the basis of a bit rate determined at the MAC Layer by taking into account the effect of the headers and control information added and/or removed at different protocol layers.

Figure 6:
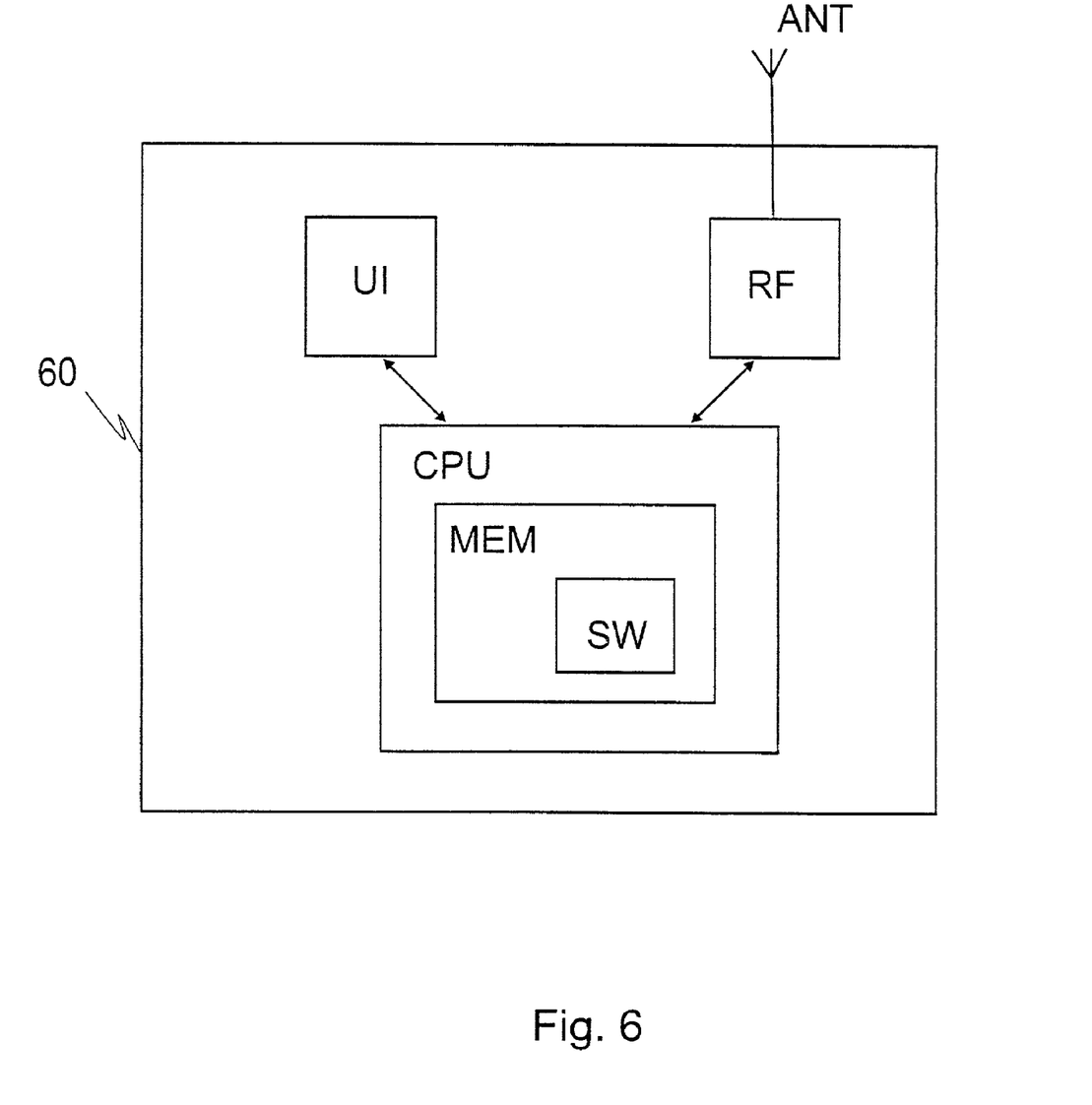
FIG. 6 is a block diagram showing the blocks of a mobile station suitable for carrying out the invention.

The invention is implemented in a communication device mainly by means of software. FIG. 6 is a block diagram of a mobile station suitable for carrying out the invention. The mobile station 60 comprises processing means CPU, a radio part RF and a user interface UI. The radio part RF and user interface UI are coupled to the processing means CPU. The user interface comprises a display and a keyboard to enable use of the mobile station 60. The processing means CPU comprise a microprocessor (not shown in FIG. 6), a memory MEM and software SW. The software SW of the mobile station 60 is stored in the memory MEM, which preferably comprises both RAM, Random Access Memory, and ROM, Read Only Memory. The microprocessor controls the operation of the mobile station 60, such as the use of the radio part, presentation of information on the user interface UI and the reading of inputs received from the user interface UI, on the basis of the software SW. The software SW comprises a WCDMA protocol stack according to which the radio part RF performs wireless transmission and reception of data blocks by means of its antenna ANT. The WCDMA protocol stack comprises a MAC Layer. Bit rate determination and maintenance of the database according to the invention are performed by the microprocessor using the software SW and memory MEM. The database according to the invention is implemented in the memory available for use by the mobile station 60. The mobile station can also comprise a microphone and a loudspeaker (not shown in FIG. 6) for receiving and re-producing a speech signal.

The invention can not only be used for bit rate determination in a terminal but also in the WCDMA protocol stack of another peer. Here the other peer is a network element of the cellular communication network, such as a base station, which transmits data to the terminal and/or receives data from the terminal.

In this description, the implementation and embodiments of the invention have been described with the aid of examples. It will be understood by a person skilled in the art that the invention is not limited to the details of the previously presented embodiments and that the invention may also be implemented in other forms without departing from the characteristics of the invention. The embodiments described herein should therefore be considered illustrative and not restrictive. Consequently, the possibilities for implementing and using the invention are limited solely by the appended claims. The different alternative implementations of the invention defined in the claims, including equivalent implementations, belong within the scope of the invention.

What is claimed is:

1. A method of determining a bit rate of information transmitted from a first communication device to a second communication device, the first communication device comprising a protocol stack, the protocol stack comprising a protocol layer, the protocol layer providing a logical channel for transferring the transmitted information through said protocol layer, the method comprising:
    transferring the information transmitted from the first communication device through the protocol layer of the first communication device via said logical channel according to a chosen transport format, the chosen transport format defining a transmission block size for transfer of said transmitted information via the logical channel, an amount of transmitted information equal to the transmission block size being transferred in a predetermined transmission time interval;
    determining, in a processor of the first communication device, a bit rate value representative of the bit rate in the logical channel on the basis of the chosen transport format by dividing the transmission block size of the chosen transport format by the predetermined transmission time interval;
    maintaining and updating an indication of the determined bit rate value in a memory available for use by the first communication device; and
    providing an indication of the determined bit rate value to another protocol layer of the first communication device or an application program to enable said other protocol layer or application program to adapt its operation.

2. A method according to claim 1, wherein said protocol stack is a WCDMA (Wideband Code Division Multiple Access) protocol stack and the first communication device communicates with said second communication device using the WCDMA protocol stack.

3. A method according to claim 2, wherein the protocol layer through which the transmitted information is transferred via said logical channel is the MAC (Medium Access Control) Layer of the WCDMA protocol stack.

4. A method according to claim 3, comprising obtaining information about the chosen transport format from the MAC Layer of the WCDMA protocol stack in response to the transfer of a data block coming from the RLC Layer of the WCDMA protocol stack from a logical channel of the MAC Layer to a transport channel of the Physical Layer of the WCDMA protocol stack in connection with transmission of the data block.

5. A method according to claim 1, wherein said first communication device is a wireless terminal of a cellular communication network and the second communication device is a network element of a cellular communication network.

6. A method according to claim 1, wherein said first communication device is a network element of a cellular communication network and said second communication device is a wireless terminal of a cellular communication network.

7. A method according to claim 1, wherein said transport format comprises parameters TBS (Transmission Block Size) and TTI (Transmission Time Interval), the method comprising determining the bit rate value representative of the bit rate in said logical channel on the basis of the values of said parameters by means of a mathematical calculation in which the value of parameter TBS is divided by the value of parameter TTI, thereby providing an estimate of the instantaneous bit-rate in the logical channel during a period of time defined by TTI.

8. A method according to claim 1, wherein said protocol layer has a plurality of logical channels including the logical channel, said method further comprising determining, at the first communication device, a plurality of bit rate values including said bit rate value, each of said plurality of bit rate values being representative of a bit rate in a corresponding one of said plurality of logical channels, each of said plurality of bit rate values being determined on the basis of a transport format chosen for the corresponding logical channel.

9. A method according to claim 8, further comprising determining a total bit rate of a PDP (Packet Data Protocol) context employing more than one of said logical channels by adding together the bit rate values of respective ones of the logical channels in use by the PDP context.

10. A method according to claim 1, comprising calculating an average bit rate in said logical channel.

11. A method according to claim 10, comprising calculating said average as a running average.

12. A method according to claim 10, comprising maintaining and updating said average in a memory available for use by the first communication device.

13. A method according to claim 1, comprising providing an indication of the determined bit rate value to a user protocol to enable said user protocol to adapt its operation.

14. A method of determining a bit rate of information received at a first communication device from a second communication device, the first communication device comprising a protocol stack, the protocol stack comprising a protocol layer, the protocol layer providing a logical channel for transferring the received information through said protocol layer, the method comprising:

transferring the information received from the second communication device through the protocol layer of the first communication device via said logical channel according to a chosen transport format, the chosen transport format defining a transmission block size for transfer of said received information via the logical channel, an amount of received information equal to the transmission block size being transferred in a predetermined transmission time interval;

determining, in a processor of the first communication device, a bit rate value representative of the bit rate in the logical channel on the basis of the chosen transport format by dividing the transmission block size of the chosen transport format by the predetermined transmission time interval;

maintaining and updating an indication of the determined bit rate value in a memory available for use by the first communication device; and providing an indication of the determined bit rate value to another protocol layer of the first communication device or an application program to enable said other protocol layer or application program to adapt its operation.

15. A method according to claim 14, wherein said first communication device comprises a WCDMA protocol stack, the method comprising obtaining information about the chosen transport format from the MAC Layer of the WCDMA protocol stack.

16. A method according to claim 14, wherein said protocol stack is a WCDMA (Wideband Code Division Multiple Access) protocol stack and that the first communication device communicates with said second communication device using the WCDMA protocol stack.

17. A method according to claim 16, wherein the protocol layer through which the received information is transferred via said logical channel is the MAC (Medium Access Control) Layer of the WCDMA protocol stack.

18. A method according to claim 14, wherein said first communication device is a wireless terminal of a cellular communication network and the second communication device is a network element of a cellular communication network.

19. A method according to claim 14, wherein said first communication device is a network element of a cellular communication network and said second communication device is a wireless terminal of a cellular communication network.

20. A method according to claim 14, wherein said transport format comprises parameters TBS (Transmission Block Size) and TTI (Transmission Time Interval), the method comprising determining the bit rate value representative of the bit rate in said logical channel on the basis of the values of said parameters by means of a mathematical calculation in which the value of parameter TBS is divided by the value of parameter TTI, thereby providing an estimate of the instantaneous bit-rate in the logical channel during a period of time defined by TTI.

21. A method according to claim 14, wherein said protocol layer has a plurality of logical channels including said logical channel, the method further comprising determining, at the first communication device, a plurality of bit rate values including said bit rate value, each of said plurality of bit rate values being representative of a bit rate in a corresponding one of said plurality of logical channels, each of said plurality of bit rate values being determined on the basis of the transport format chosen for the corresponding logical channel.

22. A method according to claim 21, comprising determining a total bit rate of a PDP (Packet Data Protocol) context employing more than one logical channel by adding together the bit rate values of the logical channels in use by the PDP context.

23. A method according to claim 14, comprising calculating an average bit rate in said logical channel.

24. A method according to claim 23, comprising calculating said average as a running average.

25. A method according to claim 23, comprising maintaining and updating said average in a memory available for use by the first communication device.

26. A method according to claim 14, comprising providing an indication of the determined bit rate value to a user protocol to enable said user protocol to adapt its operation.

27. A communication device comprising a protocol stack, the protocol stack comprising a protocol layer, the protocol layer being configured to provide a logical channel for transferring transmitted information through said protocol layer, the communication device further comprising:
  a processing unit operable to transfer the transmitted information through the protocol layer via said logical channel according to a chosen transport format, the chosen transport format defining a transmission block size for transfer of said transmitted information via the logical channel, an amount of transmitted information equal to the transmission block size being transferred in a predetermined transmission time interval;
  a bit rate estimation unit operable to determine a bit rate value representative of the bit rate in the logical channel on the basis of the chosen transport format by dividing the transmission block size of the chosen transport format by the predetermined transmission time interval; and
  a database unit operable to maintain and update an indication of the determined bit rate value in a memory available for use by the communication device,
wherein the database unit is configured to provide an indication of the determined bit rate value to another protocol layer of the communication device or an application program to enable said other protocol layer or application program to adapt its operation.

28. A communication device according to claim 27, wherein the bit rate estimation unit is operable to determine the bit rate value in the logical channel repeatedly.

29. A communication device according to claim 27, wherein the database unit is operable to maintain an average of the bit rate in the logical channel.

30. A communication device according to claim 29, wherein the database unit is operable to calculate said average as a running average.

31. A communication device comprising a protocol stack, the protocol stack comprising a protocol layer, the protocol layer being configured to provide a logical channel for transferring received information through said protocol layer, the communication device comprising:
  a processing unit operable to transfer the received information through the protocol layer via said logical channel according to a chosen transport format, the chosen transport format defining a transmission block size for transfer of said received information via the logical channel, an amount of received information equal to the transmission block size being transferred in a predetermined transmission time interval;
  a bit rate estimation unit operable to determine a bit rate value representative of the bit rate in the logical channel on the basis of the chosen transport format by dividing the transmission block size of the chosen transport format by the predetermined transmission time interval; and
  a database unit operable to maintain and update an indication of the determined bit rate value in a memory available for use by the communication device,
wherein the database unit is configured to provide an indication of the determined bit rate value to another protocol layer of the communication device or an application program to enable said other protocol layer or application program to adapt its operation.

32. A method comprising:
  receiving, in a communication device, periodic indications of a transmission block size and a transmission time interval associated with a transport format chosen for transfer of information through a protocol layer of a protocol stack of the communication device via a logical channel;
  determining, in the communication device, a bit rate value representative of the bit rate in the logical channel on the basis of the chosen transport format by dividing the indicated transmission block size by the indicated transmission time interval;
  maintaining and updating an indication of the determined bit rate value in a database; and
  providing an indication of the determined bit rate value to another protocol layer of the communication device or an application program to enable said other protocol layer or application program to adapt its operation.

33. A method according to claim 32, comprising determining bit rate values for more than one logical channel on the basis of respective transport formats chosen for said more than one logical channel.

34. A method according to claim 33, comprising determining a total bit rate of a PDP (Packet Data Protocol) context by adding together the bit rate values determined for the logical channels in use by the PDP context.

35. A method according to claim 33, comprising determining a total bit rate for the protocol layer by adding together the bit rate values determined for all logical channels of the protocol layer.

36. A method according to claim 32, comprising providing an indication of the direction of the logical channel in the database.

37. A method according to claim 32, comprising not updating the bit rate value in the database if no information is transferred through the protocol layer via the logical channel in a particular transmission time interval.

38. A method according to claim 32, comprising updating the bit rate value in the database with a value of zero if no information is transferred through the protocol layer via the logical channel in a particular transmission time interval.

39. A method according to claim 32, comprising determining that a bit rate value maintained in the database is out of date if a last update of the bit rate value was performed substantially longer ago than one transmission time interval.

40. A method according to claim 32, comprising calculating an average bit rate value representative of an average bit rate in said logical channel.

41. A method according to claim 40, comprising calculating said average as a running average of repeatedly determined bit rate values.

42. A method according to claim 40, comprising maintaining and updating said average bit rate value in the database.

43. A method according to claim 40, comprising providing an indication of at least one of a determined bit rate value and an average bit rate from the database responsive to a request received from an application program or a user protocol.

44. A method according to claim 40, comprising automatically providing an indication of at least one of a determined bit rate value and an average bit rate from the data base to an application program or a user protocol.

45. A method according to claim 32, comprising estimating a bit rate at another protocol layer of the protocol stack.

46. An apparatus comprising:
  a bit rate estimation unit operable to periodically receive indications of a transmission block size and a transmission time interval associated with a transport format chosen for transfer of information through a protocol layer of a protocol stack via a logical channel and to determine a bit rate value representative of the bit rate in the logical channel on the basis of the chosen transport format by dividing the indicated transmission block size by the indicated transmission time interval; and a database unit operable to maintain and update an indication of the determined bit rate value, wherein the database unit is configured to provide an indication of the determined bit rate value to another protocol layer or an application program to enable said other protocol layer or application program to adapt its operation.

47. Apparatus according to claim 46, wherein the bit rate estimation unit is operable to determine a bit rate value for more than one logical channel on the basis of respective transport formats chosen for said more than one logical channel.

48. Apparatus according to claim 47, wherein the database unit is coupled to receive indications of the bit rate values determined for said more than one logical channel and logical channel identifiers associated with the logical channels, and is operable to maintain and update bit rate values associated with said more than one logical channel.

49. Apparatus according to claim 48, wherein the database unit is operable to determine a total bit rate of a PDP (Packet Data Protocol) context by adding together the bit rate values determined for the logical channels in use by the PDP context.

50. Apparatus according to claim 48, wherein the database unit is operable to determine a total bit rate for the protocol layer by adding together the bit rate values determined for all logical channels of the protocol layer.

51. Apparatus according to claim 46, wherein the database unit is operable not to update the bit rate value for the logical channel if no information is transferred through the protocol layer via the logical channel in a particular transmission time interval.

52. Apparatus according to claim 46, wherein the database unit is operable to update the bit rate value for the logical channel with a value of zero if no information is transferred through the protocol layer via the logical channel in a particular transmission time interval.

53. Apparatus according to claim 46, wherein the database unit is operable to determine that a bit rate value maintained in the database is out of date if a last update of the bit rate value was performed substantially longer ago than one transmission time interval.

54. Apparatus according to claim 46, wherein the database unit is operable to maintain an average bit rate value representative of an average bit rate in said logical channel.

55. Apparatus according to claim 54, wherein the database unit is operable to calculate said average as a running average of repeatedly determined bit rate values.

56. Apparatus according to claim 54, wherein the database unit is operable to provide an indication of at least one of a determined bit rate value and an average bit rate responsive to a request received from an application program or a user protocol.

57. Apparatus according to claim 54, wherein the database unit is operable to provide an indication of at least one of a determined bit rate and an average bit rate from the data base automatically to an application program or a user protocol.

58. A communication device comprising:
a bit rate estimation unit operable to periodically receive indications of a transmission block size and a transmission time interval associated with a transport format chosen for transfer of information through a protocol layer of a protocol stack via a logical channel and to determine a bit rate value representative of the bit rate in the logical channel on the basis of the chosen transport format by dividing the indicated transmission block size by the indicated transmission time interval; and a database unit operable to maintain and update an indication of the determined bit rate value;

wherein the database unit is configured to provide an indication of the determined bit rate value to another protocol layer of the communication device or an application program to enable said other protocol layer or application program to adapt its operation.

59. A communication device according to claim 58, wherein the communication device is a mobile station of a WCDMA (Wideband Code Division Multiple Access) wireless communication network, the protocol stack is a WCDMA protocol stack and the protocol layer is a MAC (Medium Access Control) layer of the WCDMA protocol stack.

60. A communication device according to claim 58, wherein the communication device is a network element of a WCDMA (Wideband Code Division Multiple Access) wireless communication network, the protocol stack is a WCDMA protocol stack and the protocol layer is a MAC (Medium Access Control) layer of the WCDMA protocol stack.

61. A communication device comprising a memory encoded with a software program for determining a bit rate of information transferred through a protocol layer of a protocol stack via a logical channel, which, when executed by the communication device, is configured to:
periodically receive indications of a transmission block size and a transmission time interval associated with a transport format chosen for transfer of said information via the logical channel;

determine a bit rate value representative of the bit rate in the logical channel on the basis of the chosen transport format by dividing the indicated transmission block size by the indicated transmission time interval;

maintain and update an indication of the determined bit rate value in a database; and provide an indication of the determined bit rate value to another protocol layer of the communication device or an application program to enable said other protocol layer or application program to adapt its operation.

62. A communication device according to claim 61, wherein the software program is configured to determine bit rate values for more than one logical channel on the basis of respective transport formats chosen for said more than one logical channel.

63. A communication device according to claim 62, wherein the software program is configured determine a total bit rate of a PDP (Packet Data Protocol) context by adding together the bit rate values determined for the logical channels in use by the PDP context.

64. A communication device according to claim 62, wherein the software program is configured to determine a total bit rate for the protocol layer by adding together the bit rate values determined for all logical channels of the protocol layer.

65. A communication device according to claim 61, wherein the software program is configured to provide an indication of the direction of the logical channel in the database.

66. A communication device according to claim 61, wherein the software program is configured not to update the bit rate value in the database if no information is transferred through the protocol layer via the logical channel in a particular transmission time interval.

67. A communication device according to claim 61, wherein the software program is configured to update the bit rate value in the database with a value of zero if no information is transferred through the protocol layer via the logical channel in a particular transmission time interval.

68. A communication device according to claim 61, wherein the software program is configured to determine that a bit rate value maintained in the database is out of date if a last update of the bit rate value was performed substantially longer ago than one transmission time interval.

69. A communication device according to claim 61, wherein the software program is configured to calculate an average bit rate value representative of an average bit rate in said logical channel.

70. A communication device according to claim 69, wherein the software program is configured to calculate said average as a running average of repeatedly determined bit rate values.

71. A communication device according to claim 69, wherein the software program is configured to maintain and update said average bit rate value in the database.

72. A communication device according to claim 69, wherein the software program is configured to provide an indication of at least one of a determined bit rate value and an average bit rate from the database responsive to a request received from an application program or a user protocol.

73. A communication device according to claim 69, wherein the software program is configured to automatically provide an indication of at least one of a determined bit rate value and an average bit rate from the data base to an application program or a user protocol.

74. A communication device according to claim 61, wherein the software program is configured to estimate a bit rate at another protocol layer of the protocol stack.

* * * * *